(12) United States Patent
Tiana et al.

(10) Patent No.: US 11,831,988 B2
(45) Date of Patent: Nov. 28, 2023

(54) SYNTHETIC GEOREFERENCED WIDE-FIELD OF VIEW IMAGING SYSTEM

(71) Applicant: Rockwell Collins, Inc., Cedar Rapids, IA (US)

(72) Inventors: Carlo L Tiana, Portland, OR (US); Brian Helfrecht, Batavia, IL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 290 days.

(21) Appl. No.: 17/397,491

(22) Filed: Aug. 9, 2021

(65) Prior Publication Data

US 2023/0039414 A1 Feb. 9, 2023

(51) Int. Cl.
| | |
|---|---|
| *G06F 16/29* | (2019.01) |
| *H04N 23/698* | (2023.01) |
| *H04N 5/265* | (2006.01) |
| *G01S 13/89* | (2006.01) |
| *B64D 43/00* | (2006.01) |
| *B64D 47/02* | (2006.01) |
| *B64D 47/08* | (2006.01) |
| *H04N 23/90* | (2023.01) |

(52) U.S. Cl.
CPC .......... *H04N 23/698* (2023.01); *B64D 43/00* (2013.01); *B64D 47/02* (2013.01); *B64D 47/08* (2013.01); *G01S 13/89* (2013.01); *H04N 5/265* (2013.01); *H04N 23/90* (2023.01)

(58) Field of Classification Search
CPC ............ G06T 2207/10028; G06T 7/70; G06T 19/006; G06T 2207/10032; G06T 15/205; G06T 2207/20221; G06T 2207/20212; G06T 2207/30244; G06F 16/29; G06F 16/28; G09G 2380/10; H04N 23/698; H04N 23/45; H04N 23/6812; H04N 2201/3253

See application file for complete search history.

(56) References Cited

U.S. PATENT DOCUMENTS

| | | | |
|---|---|---|---|
| 7,468,740 | B2 | 12/2008 | Han |
| 8,462,209 | B2 | 6/2013 | Sun |
| 8,830,347 | B2 | 9/2014 | Jin |
| 8,862,987 | B2 | 10/2014 | Haussecker et al. |
| 9,041,898 | B1 | 5/2015 | Reilly et al. |
| 9,652,828 | B1 | 5/2017 | Sabripour et al. |
| 9,930,253 | B2 | 3/2018 | Mate et al. |
| 10,412,395 | B2 | 9/2019 | Woody et al. |
| 2014/0009570 | A1 | 1/2014 | Gorstan et al. |
| 2015/0022281 | A1 | 1/2015 | Oakes et al. |
| 2019/0360810 | A1* | 11/2019 | Johnson ............... G01C 21/005 |

* cited by examiner

*Primary Examiner* — Hau H Nguyen

(74) *Attorney, Agent, or Firm* — Suiter Swantz pc llo

(57) ABSTRACT

An imaging system for an aircraft is disclosed. A plurality of image sensors are attached, affixed, or secured to the aircraft. Each image sensor is configured to generate sensor-generated pixels based on an environment surrounding the aircraft. Each of the sensor-generated pixels is associated with respective pixel data including, position data, intensity data, time-of-acquisition data, sensor-type data, pointing angle data, latitude data, and longitude data. A controller generates a buffer image including synthetic-layer pixels, maps the sensor-generated pixels to the synthetic-layer pixels in the buffer image, fills a plurality of regions of the buffer image with the sensor-generated pixels, and presents the buffer image on a head-mounted display (HMD) to a user of the aircraft.

11 Claims, 4 Drawing Sheets

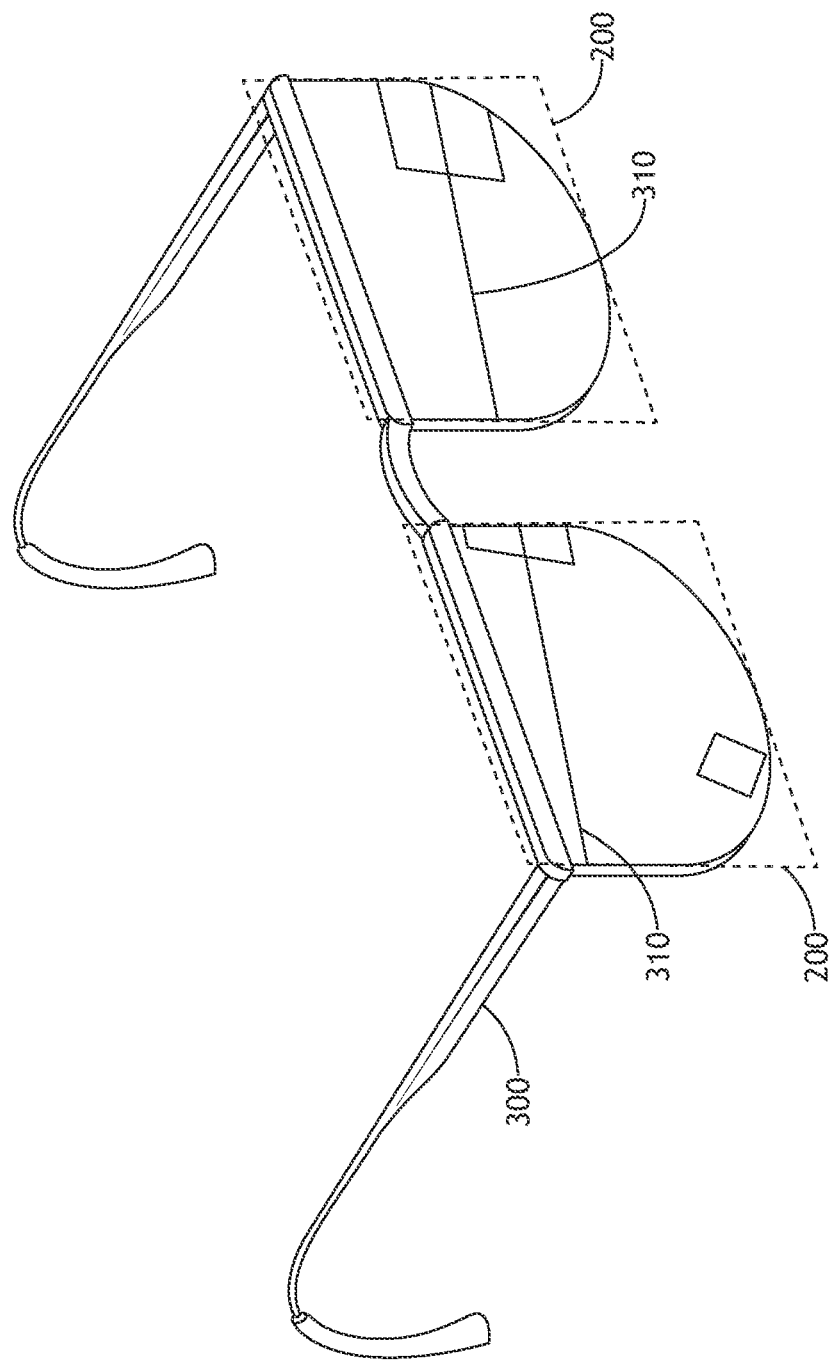

SYNTHETIC GEOREFERENCED WIDE-FIELD OF VIEW IMAGING SYSTEM

SUMMARY

An imaging system for an aircraft system is disclosed in accordance with one or more illustrative embodiments of the present disclosure. In one illustrative embodiment, the system comprises a plurality of image sensors attached, affixed, or secured to the aircraft, wherein each image sensor is configured to generate sensor-generated pixels based on an environment surrounding the aircraft, wherein each of the sensor-generated pixels is associated with respective pixel data including: position data, intensity data, time-of-acquisition data, sensor-type data, pointing angle data, and latitude data and longitude data derived from the pointing angle data. In another illustrative embodiment, the system comprises a controller communicatively coupled to the plurality of image sensors, configured to: generate a buffer image including synthetic-layer pixels, wherein each of the synthetic-layer pixels is associated with latitude data and longitude data derived from a synthetic vision database; map the sensor-generated pixels to the synthetic-layer pixels in the buffer image by matching the latitude data and the longitude data derived from the pointing angle data with the latitude data and the longitude data derived from the synthetic vision database; fill a plurality of regions of the buffer image with the sensor-generated pixels, wherein each respective one of the regions of the buffer image is respectively filled by the sensor-generated pixels generated by a respective one of the image sensors; and present the buffer image on a head-mounted display (HMD) to a user of the aircraft.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIGS. 3-4 are isometric views of a head mounted display (HMD), in accordance with one or more embodiments of the present disclosure.

DETAILED DESCRIPTION

Figure 1:
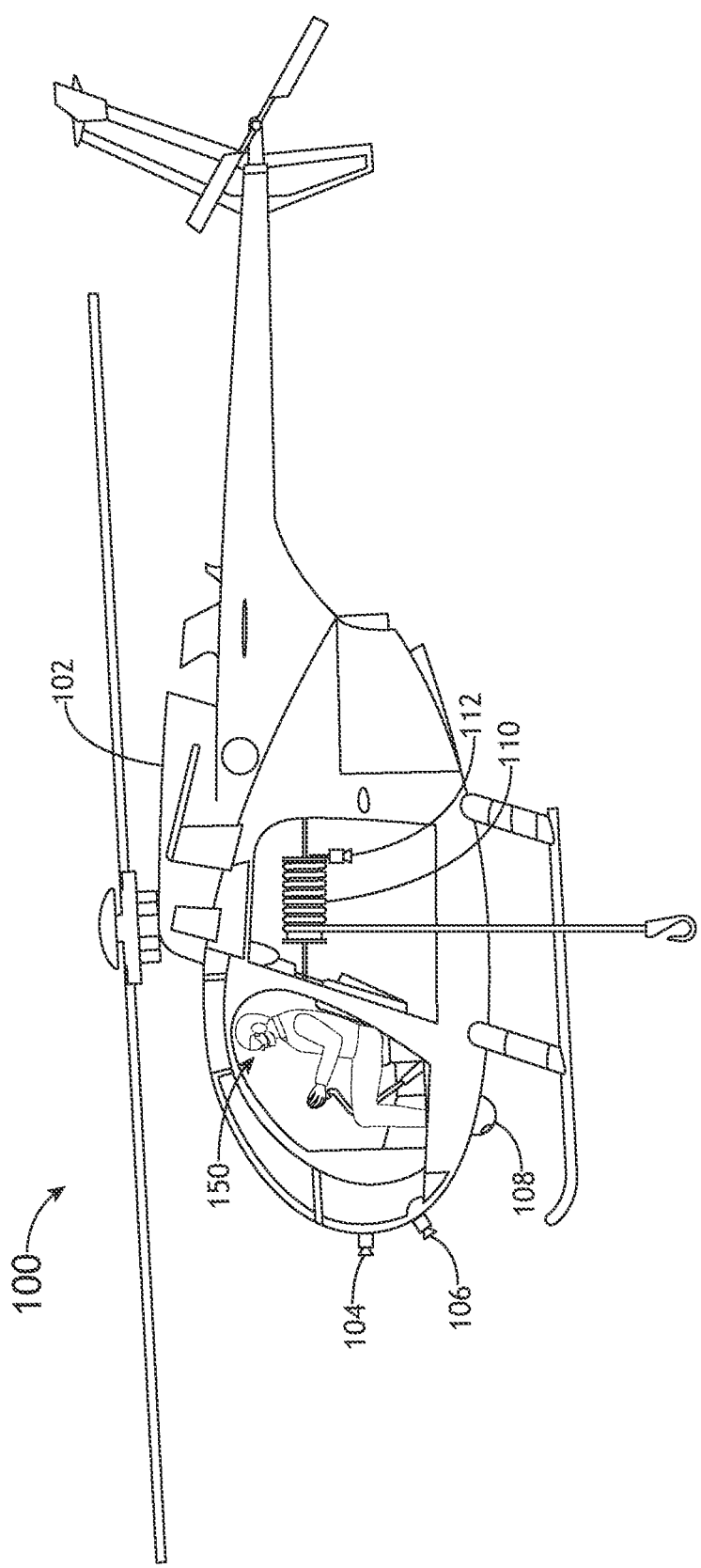
FIG. 1 is a side view of an imaging system for an aircraft, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Real-time imaging systems are used to provide situational awareness to pilots in adverse visibility conditions (for example, during helicopter search and rescue missions). Real-time imaging systems can include, for example, a head mounted display (HMD) configured to receive and display imagery from one or more cameras externally mounted on an aircraft or other vehicle. A limitation of such real-time imaging systems is a small field of view (FOV) that can be inadequate for tasks such as finding a stranded person during a search and rescue (SAR) operation. This limitation is sometimes overcome by distributed aperture systems which replicate a camera multiple times to increase field of view. However, this solution is costly due to the extensive hardware and engineering requirements (mounting and integrating several high definition cameras on an aircraft).

Various platforms (e.g., both military and civilian) are already equipped with imaging systems capable of displaying a larger FOV obtained by panning a slewable turreted camera with a limited FOV. When these systems are paired with HMDs on the head of a user (e.g., pilot or SAR operator), the long time required to rotate the camera in the direction of sight of the user can be unacceptably slow. Thus, a solution that employs cameras that are commonly found on aircraft imaging systems is desirable.

Embodiments of the present disclosure are directed to an imaging system that introduces metadata into a video stream of multiple image sensors (i.e., cameras) on a per-pixel basis including time, sensor-type, camera-specific information (pointing angle, magnification settings, position encoder readouts, etc.), and georeference information. In some embodiments, the video stream may include an underlying synthetic terrain representation. The metadata is then used to generate a wraparound image that appears to be a real time image. The present imaging system generates a real-time, wide-field image for pilot consumption on a transparent display by leveraging image sensors already deployed on many platforms, without the need to install multiple additional image sensors.

FIG. 1 is a side view of an imaging system 100, in accordance with one or more embodiments of the present disclosure. The imaging system 100 may be substantially integrated with a vehicle 102. As shown, the vehicle 102 may be a helicopter, although the present disclosure is not limited thereto. For example, the vehicle 102 may comprise a land vehicle (e.g., car or truck), a marine-based vehicle (e.g., ship or boat), or another aerial vehicle (e.g., airplane). The vehicle 102 may be occupied by one or more users 150 (for example, a pilot 150 operating the vehicle, and a search and rescue operator 150 surveying the environment for stranded evacuees). The vehicle 102 may include a winch 110 including a cable to lower rescue teams and extricate evacuees while the vehicle 102 hovers overhead (thus avoiding obstacles or ocean troughs). In some embodiments, the winch 110 may incorporate one or more cameras to monitor the winching operations.

The imaging system 100 may include a fixed image sensor 104, a searchlight image sensor 106, a turreted image sensor 108, and a winch image sensor 112. It is noted that each of the image sensors 104, 106, 108 and 112 may be image detectors (e.g., focal plane arrays) configured to detect visual and/or IR light, and that each may comprise a charge-coupled device (CCD) or a complementary metal-oxide-semiconductor (CMOS) device.

The fixed image sensor 104 may be attached, affixed, or secured on a front portion of the vehicle 102 (e.g., at the helicopter nose) and may capture images of the environment surrounding the vehicle 102 (e.g., in front of the vehicle). The fixed image sensor 104 may be configured to be static (e.g., fixed in place) while the vehicle 102 moves to provide stable images. The searchlight image sensor 106 may be attached, affixed or secured to a moveable searchlight (floodlight) attached to a front portion of the vehicle 102. The searchlight image sensor 106 may be configured to rotate in conjunction with the searchlight operated by the user(s) 150 to capture images of the environment surrounding the vehicle 102 in the direction of a beam output by the searchlight. The turreted image sensor 108 may be attached, affixed, or secured to a frontal portion of the vehicle 102, and may be a ball-and-socket type image sensor capable of rotating (e.g., in two degrees of freedom—horizontal and vertical rotation). The turreted image sensor 108 may capture images of the environment surrounding the vehicle 102 (e.g., in front of the vehicle 102, to the sides of the vehicle 102, and behind the vehicle 102). The winch image sensor 112 may be configured to capture images of the environment below the vehicle 102 (e.g., in the direction of extension of a winch cable). Thus, each of the image sensors 104, 106, 108 and 112 may be configured to separately generate pixels for a georeferenced buffer image.

In some embodiments, the image sensors 104, 106, 108, and/or 112 may comprise one or more imaging radars (e.g., in addition to, or instead of, CCD or CMOS cameras) configured to capture images of the environment surrounding the vehicle 102 by detecting radio frequency (RF) radiation. The one or more imaging radars may emit an RF signal and register the intensity of a reflected RF signal to determine an amount of scattered light. The registered scattering may then be mapped onto a two-dimensional plane (e.g., with points with a higher reflectivity assigned a brighter color) to generate imagery.

Figure 2:
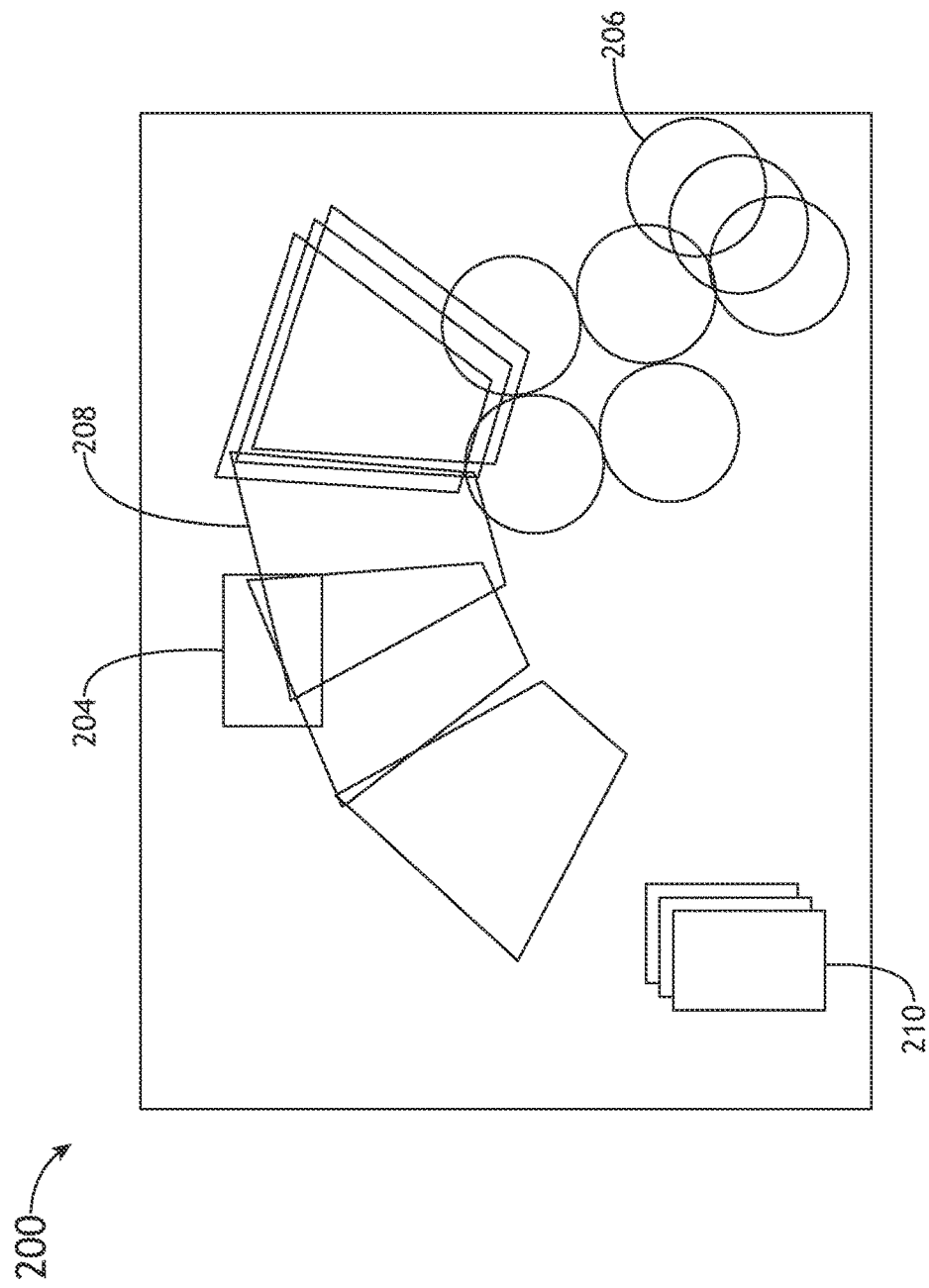
FIG. 2 is a georeferenced buffer image constructed by sensor fusion, in accordance with one or more embodiments of the present disclosure.

FIG. 2 is a georeferenced buffer image 200 constructed by sensor fusion, in accordance with one or more embodiments of the present disclosure. The georeferenced buffer image 200 may be generated using a controller (e.g., computer or computing device) on-board the vehicle 102 or communicatively coupled to a HMD worn by the user(s) 150.

The buffer image 200 may comprise a matrix of pixels with a plurality of pixel columns and a plurality of pixel rows. Each respective image sensor 104, 106, 108, and 112 may independently generate imagery for generation of the pixels in respective regions of the buffer image 200 at a respective filling rate. For example, the fixed image sensor 104 may generate imagery for the pixels in region 204, the searchlight image sensor 106 may generate imagery for the pixels in region 208, the turreted image sensor 108 may generate imagery for the pixels in region 206, and the winch image sensor 112 may generate imagery for pixels in the region 210.

In some embodiments, each of the regions 204, 206, 208 and 210 of the buffer image 200 are separate and do not overlap. In other embodiments, each of the regions 204, 206, 208 and 210 of the buffer image 200 may overlap with each other (partially or substantially). If the regions overlap, then the imagery from one of the image sensors 104, 106, 108, and 112 may be prioritized for generation of the pixels in the overlapping area between the regions. For example, if the region 204 overlaps with the region 208, then the imagery from the searchlight image sensor 106 may be prioritized over the imagery from the fixed image sensor 104 for generation of pixels in the overlapping area.

In addition to position data (e.g., the xy address in the image matrix) and intensity data (e.g., one value for grayscale images, and three values for color images), each pixel in the buffer image 200 may be associated with metadata including but not limited to time-of-acquisition data (e.g., a timestamp indicating the time that each pixel is captured), sensor-type data (e.g., the type of image sensor used to capture the pixel), and pointing angle data (e.g., indicating the direction that the respective sensor is facing when the pixel is captured). The pointing angle data of the respective image sensor 104, 106, 108, and 112 may be used to generate longitude data and latitude data for each generated pixel.

The pointing angle data may be generated from a position encoder, inertial measurement unit (IMU), or an attitude and heading reference system (AHRS) embedded with (or communicatively coupled to) the respective image sensor 104, 106, 108, and/or 112. The pointing angle data as presented herein may be advantageous in that conventional image sensors currently provide pointing angle data in relatively large steps (e.g., 1° or 2° of rotation at a time) whereas the present system 100 may provide more precise pointing angle data (e.g., at the milliradian level) by using a position encoder, IMU, or AHRS.

In some embodiments, the controller may generate a synthetic layer in the buffer image 200. The synthetic layer may comprise synthetic imagery for the generation of pixels in the regions 204, 206, 208 and/or 210 using a synthetic imagery database (e.g., from a synthetic vision system [SVS] or a combined vision system [CVS] of an aircraft). The synthetic layer may present synthetic terrain (e.g., 3D polygonal representations of the surface of the earth) and obstacles (e.g., icons of buildings, radio towers, etc.), and may be textured using artificially generated textures or satellite imagery.

The synthetic layer may provide a baseline magnification (e.g., zoom) and horizon line for the buffer image 200. The pixels generated by the image sensors 104, 106, 108, and 112 may be mapped to the pixels generated by the synthetic layer (e.g., by matching latitude and longitude values derived from the pointing angle metadata associated with the sensor-generated pixels with latitude and longitude values derived from a synthetic vision database). When the image sensors are functional, the sensor-generated pixels generated may override the pixels of the synthetic layer, so that the sensor-generated pixels are presented to the user 150 on the HMD. However, when one of the image sensors is nonfunctional (e.g., stops streaming image data/generating pixels), the pixels of the synthetic layer may override the sensor-generated pixels in the respective region of the buffer image 200 so that the pixels of the synthetic layer are presented to the user 150 on the HMD. In some embodiments, the system 100 may further include one or more imaging radars that generate radar-based pixels in the regions 204, 206, 208 and/or 210 of the buffer image 200.

In some embodiments, the buffer image 200 may be generated as a multi-plane digital image buffer. In other embodiments, the buffer 200 may be constructed using a more compact representation of the data (such as a list of "pixel vectors" only containing pixel values and other metadata for the generated from the environment captured by the image sensors).

Figure 3:
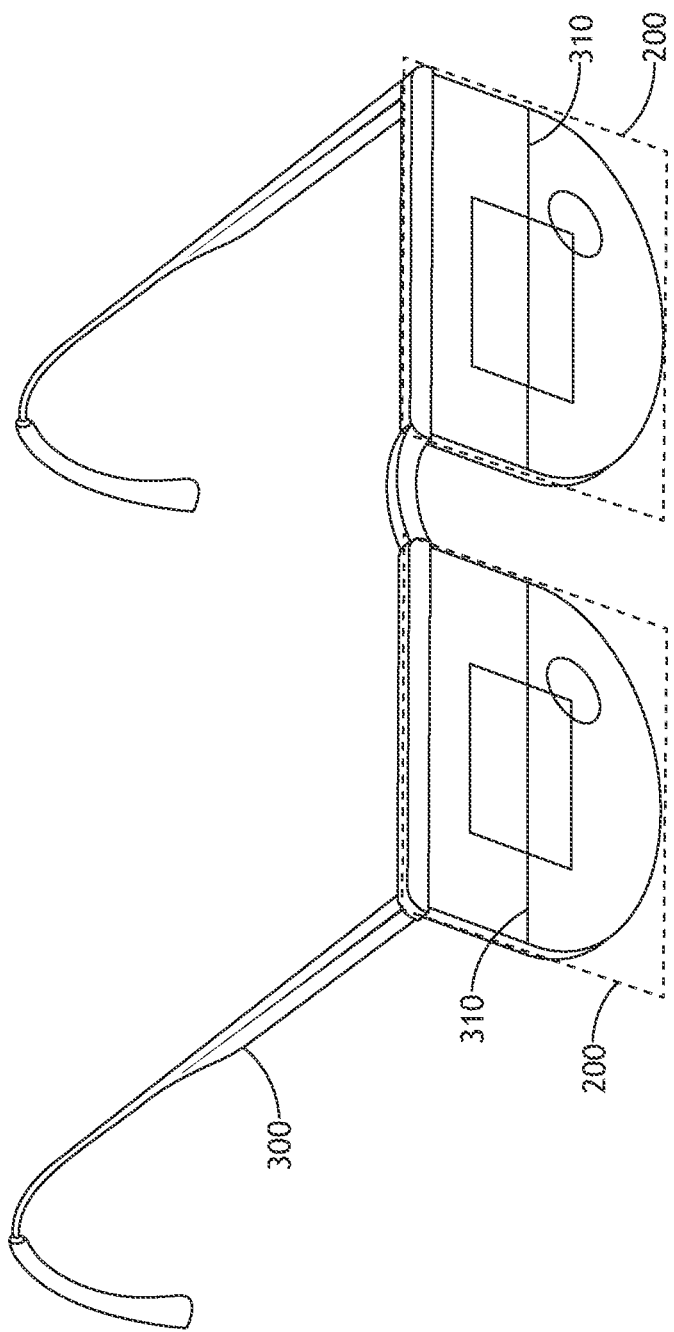

FIG. 3 is an isometric view of an HMD 300 configured to be worn by the user(s) 150, in accordance with one or more embodiments of the present disclosure. The horizontal line 310 that is parallel with the top of the frame of the HMD 300 may serve as a reference to indicate that head of the user 150 is level. The horizon line 310 may be derived from a synthetic vision system database and may provide a baseline level of magnification. As shown, the HMD 300 may be a pair of glasses, however the present disclosure is not limited thereto, and the HMD 300 may be a helmet, goggles, etc. The buffer image 200 may be presented (e.g., by projection, or by using LEDs) on a display portion of the HMD 300. In some embodiments, the HMD 300 presents a stereoscopic pair of buffer images 200 (e.g., one image 200 to each eye of the user 150). In some embodiments, only the portion of the buffer image 200 that is visible within the optical field of view of the user 150 is presented on the HMD 300.

FIG. 4 is an isometric view of the HMD 300 shown in FIG. 3. The horizon line 310 is shifted, indicating that the user 150 has moved their head. Thus, a new region of the buffer 200 is shown on the HMD 300.

It is noted herein that the controller (e.g., computer or computing device) may include one or more processors and a memory. For the purposes of the present disclosure, the term "processor" or "processing element" may be broadly defined to encompass any device having one or more processing or logic elements, for example, one or more central processing units (CPUs), one or more graphics processing units (GPUs), one or more micro-processor devices, one or more application specific integrated circuit (ASIC) devices, one or more field programmable gate arrays (FPGAs), or one or more digital signal processors (DSPs). In this sense, the one or more processors may include any device configured to execute algorithms and/or instructions (e.g., program instructions stored in memory), and may be configured to perform the method steps described in the present disclosure (e.g., generate a buffer image including synthetic-layer pixels, map the sensor-generated pixels to the synthetic-layer pixels in the buffer image, fill a plurality of regions of the buffer image with the sensor-generated pixels, and present the buffer image on a head-mounted display (HMD) to a user of the aircraft). The memory medium may include any storage medium known in the art suitable for storing program instructions executable by the associated one or more processors. For example, the memory medium may include, but is not limited to, a read-only memory (ROM), a random-access memory (RAM), a magnetic or optical memory device (e.g., hard disk), a magnetic tape, a solid-state drive and the like.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An imaging system for an aircraft, comprising:
   a plurality of image sensors attached, affixed, or secured to the aircraft, wherein each image sensor is configured to generate sensor-generated pixels based on an environment surrounding the aircraft, wherein each of the sensor-generated pixels is associated with respective pixel data including:
      position data,
      intensity data,
      time-of-acquisition data,
      sensor-type data,
      pointing angle data, and
      latitude data and longitude data derived from the pointing angle data; and
   a controller communicatively coupled to the plurality of image sensors, configured to:
      generate a buffer image including synthetic-layer pixels, wherein each of the synthetic-layer pixels is associated with latitude data and longitude data derived from a synthetic vision database,
      map the sensor-generated pixels to the synthetic-layer pixels in the buffer image by matching the latitude data and the longitude data derived from the pointing angle data with the latitude data and the longitude data derived from the synthetic vision database,
      fill a plurality of regions of the buffer image with the sensor-generated pixels, wherein each respective one of the regions of the buffer image is respectively filled by the sensor-generated pixels generated by a respective one of the image sensors,
      present the buffer image on a head-mounted display (HMD) to a user of the aircraft.

2. The imaging system of claim 1, wherein the pointing angle data is generated by a respective position encoder embedded with or communicatively coupled to each of the image sensors.

3. The imaging system of claim 1, wherein the pointing angle data is generated by a respective inertial measurement unit (IMU) embedded with or communicatively coupled to each of the image sensors.

4. The imaging system of claim 1, wherein the pointing angle data is generated by a respective attitude and heading reference system (AHRS) embedded with or communicatively coupled to each of the image sensors.

5. The imaging system of claim 1, wherein the plurality of image sensors includes at least one fixed image sensor and at least one rotatable image sensor.

6. The imaging system of claim 5, wherein the aircraft includes a winch attached, affixed, or secured thereto, wherein the winch includes a winch cable extendable in a first direction, and the at least one fixed image sensor comprises a winch image sensor configured to capture the environment in the first direction.

7. The imaging system of claim 5, wherein the aircraft includes a rotatable searchlight, and the at least one rotatable image sensor comprises a searchlight image sensor configured to rotate in conjunction with the rotatable searchlight.

8. The imaging system of claim 5, wherein the at least one rotatable image sensor includes a turreted image sensor.

9. The imaging system of claim 1, wherein at least one of the plurality of image sensors is configured to detect visual light or infrared light.

10. The imaging system of claim 1, wherein at least one of the plurality of image sensors comprises a charge-coupled device (CCD) or a complementary metal-oxide-semiconductor (CMOS) device.

11. The imaging system of claim 1, wherein at least one of the plurality of image sensors comprises an imaging radar configured to detect radio frequency radiation.

* * * * *